United States Patent
Williges et al.

(10) Patent No.: US 11,268,421 B2
(45) Date of Patent: Mar. 8, 2022

(54) REGENERATION AIR SYSTEM FOR AN EXHAUST AFTERTREATMENT SYSTEM OF AN INTERNAL COMBUSTION ENGINE, AND METHOD FOR EXHAUST AFTERTREATMENT

(71) Applicant: VOLKSWAGEN AKTIENGESELLSCHAFT, Wolfsburg (DE)

(72) Inventors: Martin Williges, Gifhorn (DE); Lars Stratmann, Brome (DE); Rene Fink, Wismar (DE)

(73) Assignee: VOLKSWAGEN AKTIENGESELLSCHAFT, Wolfsburg (DE)

( * ) Notice: Subject to any disclaimer, the term of this patent is extended or adjusted under 35 U.S.C. 154(b) by 50 days.

(21) Appl. No.: 16/741,947

(22) Filed: Jan. 14, 2020

(65) Prior Publication Data
US 2020/0224573 A1    Jul. 16, 2020

(30) Foreign Application Priority Data

Jan. 14, 2019  (DE) ............ 10 2019 100 752.6

(51) Int. Cl.
*F01N 3/22* (2006.01)
*F01N 3/025* (2006.01)
(Continued)

(52) U.S. Cl.
CPC ........... *F01N 3/22* (2013.01); *F01N 3/025* (2013.01); *F01N 3/2033* (2013.01); *F01N 3/30* (2013.01);
(Continued)

(58) Field of Classification Search
CPC .. F01N 2560/025; F01N 2550/14; F01N 3/32; F01N 3/30; F01N 3/22; F01N 2900/1804
See application file for complete search history.

(56) References Cited

U.S. PATENT DOCUMENTS 5,423,180 A * 6/1995 Nobue ............ F01N 3/032
                                                 60/274
5,517,848 A * 5/1996 Hosoya .......... F01N 3/306
                                                 73/23.31
(Continued)

FOREIGN PATENT DOCUMENTS

DE    102 49 421 A1    5/2004
DE    102 57 153 A1    6/2004
(Continued)

OTHER PUBLICATIONS

Search report for German Patent Application No. 10 2019 100 752.6, dated Feb. 7, 2020.
(Continued)

*Primary Examiner* — Anthony Ayala Delgado
(74) *Attorney, Agent, or Firm* — Pearl Cohen Zedek Latzer Baratz LLP

(57) ABSTRACT

The invention relates to a regeneration air system for an exhaust aftertreatment system of an internal combustion engine and to such an exhaust aftertreatment system. The regeneration air system comprises a regeneration air delivery element, a regeneration air duct, and a regeneration air valve. A sensor system is provided in the regeneration air duct with which a regeneration air mass flow $\dot{m}_{SL}$ can be determined exactly. The exhaust aftertreatment system comprises an exhaust system with an exhaust duct in which, in the direction of flow of an exhaust gas through the exhaust duct, a three-way catalytic converter is arranged underhood and a four-way catalytic converter is arranged downstream. A provision is made that an intake point for the regeneration (Continued)

air from the regeneration air system is formed on the exhaust duct downstream from the underhood three-way catalytic converter and upstream from the four-way catalytic converter.

6 Claims, 3 Drawing Sheets

(51) Int. Cl.
 *F01N 3/20* (2006.01)
 *F01N 3/30* (2006.01)
 *F01N 9/00* (2006.01)
(52) U.S. Cl.
 CPC .......... *F01N 9/002* (2013.01); *F01N 2240/14* (2013.01); *F01N 2250/02* (2013.01); *F01N 2550/14* (2013.01); *F01N 2560/025* (2013.01); *F01N 2560/06* (2013.01); *F01N 2610/03* (2013.01)

(56) References Cited

U.S. PATENT DOCUMENTS

| | | | |
|---|---|---|---|
| 2004/0107693 A1 | 6/2004 | Bayerle et al. | |
| 2011/0072800 A1* | 3/2011 | Bidner | F02M 26/47 60/286 |
| 2012/0117962 A1* | 5/2012 | VanDyne | F02B 37/168 60/600 |
| 2012/0124995 A1* | 5/2012 | Springer | F01N 9/00 60/605.1 |
| 2013/0312407 A1* | 11/2013 | Surnilla | F02D 41/0002 60/605.1 |
| 2014/0123627 A1 | 5/2014 | Larose, Jr. et al. | |
| 2014/0238364 A1* | 8/2014 | Beyer | F02M 35/10222 123/568.21 |
| 2016/0305302 A1* | 10/2016 | Martin | F01N 3/103 |
| 2017/0122166 A1* | 5/2017 | Nilsson | B01D 46/0027 |
| 2017/0370264 A1 | 12/2017 | Meier et al. | |
| 2019/0203629 A1 | 7/2019 | Zink | |

FOREIGN PATENT DOCUMENTS

| | | |
|---|---|---|
| DE | 10 2010 037 454 A1 | 3/2012 |
| DE | 10 2015 212 514 A1 | 1/2017 |
| DE | 10 2015 215 373 A1 | 2/2017 |
| DE | 10 2016 206 394 A1 | 10/2017 |
| DE | 10 2016 211 274 A1 | 12/2017 |
| DE | 10 2016 211 595 A1 | 12/2017 |
| DE | 10 2016 218 818 A1 | 3/2018 |
| DE | 10 2016 220 831 A1 | 4/2018 |
| DE | 10 2017 115 399 A1 | 1/2019 |

OTHER PUBLICATIONS

Extended search report for European Patent Application No. EP 20 15 1477, dated Mar. 10, 2020.
Office Action and Search Report for Chinese Patent Application No. 202010036540.0, dated Jun. 30, 2021.

* cited by examiner

REGENERATION AIR SYSTEM FOR AN EXHAUST AFTERTREATMENT SYSTEM OF AN INTERNAL COMBUSTION ENGINE, AND METHOD FOR EXHAUST AFTERTREATMENT

CROSS-REFERENCE TO RELATED APPLICATIONS

This application claims priority from German Patent Application No. 10 2019 100 752.6, filed Jan. 14, 2019, which is hereby incorporated by reference.

FIELD OF THE INVENTION

The invention relates to a regeneration air system for exhaust aftertreatment of an internal combustion engine, to an exhaust aftertreatment system with such a regeneration air system, and to a method for exhaust aftertreatment of an internal combustion engine according to the preamble of the independent claims.

BACKGROUND OF THE INVENTION

The continuous tightening of the exhaust emission legislation places high demands on vehicle manufacturers, which are met through appropriate measures for reducing engine raw emissions and through corresponding exhaust aftertreatment. With the introduction of legislation tier EU6, a limit value for gasoline engines is prescribed for a number of particles, which in many cases necessitates the use of a gasoline particulate filter. When driving, such a gasoline particulate filter becomes loaded with soot. In order to prevent the exhaust-gas backpressure from increasing excessively, this gasoline particulate filter must be regenerated continuously or periodically. In order to carry out thermal oxidation of the soot retained in the gasoline particulate filter with oxygen, a sufficiently high temperature level in conjunction with simultaneously existing oxygen in the exhaust system of the gasoline engine is required. Since modern gasoline engines are normally operated without an oxygen surplus with a stoichiometric combustion air ratio ($\lambda$=1), additional measures are required. Examples of measures that merit consideration for this purpose include an increase in temperature through a ignition angle adjustment, a temporary lean setting of the gasoline engine, injection of secondary air into the exhaust system, or a combination of these measures. An ignition angle adjustment toward late in combination with a lean setting of the gasoline engine has heretofore been preferably used, since this method requires no additional components and can deliver a sufficient amount of oxygen at most operating points of the gasoline engine. Furthermore, the aim is to bring the catalysts in the exhaust duct of the internal combustion engine to an operating temperature as quickly as possible after a cold start in order to achieve a high conversion rate for harmful exhaust gas components as quickly as possible.

If the particulate filter is arranged in an underbody position of a motor vehicle remote from the engine, it is difficult to heat the particulate filter to a temperature at low engine load at which regeneration of the particulate filter is possible by burning off the soot retained in the particulate filter. A particulate filter with a three-way catalytic coating is used to enable regeneration, particularly in low-load phases as well. A substoichiometric combustion air ratio of the internal combustion engine and simultaneous injection of regeneration air exothermally convert the unburned exhaust gas components on the catalytically active coating of the particulate filter, thereby heating up the particulate filter.

A device for determining the amount of secondary air is known from DE 102 57 153 A1 in which a pressure is determined on two different cross sections in the secondary-air line and an inference is made from the determined pressure about the amount of secondary air.

An exhaust aftertreatment system for an internal combustion engine is known from DE10 2010 037 454 A1 in which an exhaust aftertreatment component can be heated to an operating temperature by means of an exhaust-gas burner. The exhaust-gas burner is supplied by means of an air supply system with a secondary-air pump, the amount of air supplied to the exhaust-gas burner being determined by means of a mass flow sensor in order to regulate the combustion air ratio of the exhaust gas burner.

SUMMARY OF THE INVENTION

The invention is based on the object of improving the regulation of the amount of regeneration air and thus enabling the regeneration of a particulate filter in the underbody position of a motor vehicle even at low engine loads.

According to the invention, this object is achieved by a regeneration air system for an exhaust aftertreatment system of an internal combustion engine, the regeneration air system comprising a regeneration air delivery element, a regeneration air duct, and a regeneration air valve, with a sensor system for determining a regeneration air mass flow $\dot{m}_{SL}$ being arranged in the regeneration air duct. A regeneration air blower or a regeneration air compressor, in particular a regeneration air pump, is provided as the regeneration air delivery element. The quantity of air supplied to the regeneration air delivery element can be determined by a sensor system, thus enabling the regeneration air mass flow $\dot{m}_{SL}$ to be determined with precision. Improved exhaust aftertreatment of the internal combustion engine is thus possible. In addition, the regeneration air delivery element can be connected to the outlet of the internal combustion engine via a second duct, it being possible for secondary air to be introduced into the exhaust duct via the second duct in order to heat an underhood three-way catalytic converter to its operating temperature as quickly as possible.

Advantageous developments and improvements of the regeneration air system that is specified in the independent claim can be achieved by means of the features presented in the dependent claims.

In a preferred embodiment of the invention, a provision is made that the sensor system for determining the regeneration air mass flow $\dot{m}_{SL}$ comprises an air mass meter. In an air mass meter, the output signal of the sensor changes as a function of the mass flow, so that the air mass supplied to the regeneration air delivery element can be inferred. This enables a fine adjustment of the regeneration air mass flow $\dot{m}_{SL}$ to be performed.

It is especially preferred if the air mass meter is embodied as a hot-film air mass meter. A hot-film air mass meter makes it possible for an especially exact determination to be made of the air mass flow supplied to the regeneration air delivery element.

In another preferred embodiment of the invention, a provision is made that the sensor system comprises at least one pressure sensor. The inflow of fresh air changes the dynamic pressure in the regeneration air line. It is thus possible to infer an air mass flow being supplied to the regeneration air delivery element on the basis of the change in pressure.

It is especially preferred if the sensor system comprises a differential pressure sensor for determining a pressure difference over the regeneration air delivery element. A differential pressure sensor that determines a pressure difference over the regeneration air delivery element enables an especially precise control of the regeneration air mass flow $\dot{m}_{SL}$ to be achieved. The regeneration air mass flow can $\dot{m}_{SL}$ determined on the basis of the pressure difference and the speed of the regeneration air delivery element and regulated accordingly.

In a preferred embodiment of the regeneration air system, a provision is made that the regeneration air system comprises a regulator that regulates the delivery quantity of the regeneration air delivery element by means of the sensors. By using a regulator that regulates the speed of the regeneration air delivery element, the regeneration air mass flow $\dot{m}_{SL}$ can be adapted exactly to the requirements in the exhaust aftertreatment system.

According to the invention, an exhaust aftertreatment system for an internal combustion engine with an exhaust system is proposed which can be connected to an outlet of an internal combustion engine, the exhaust system having an exhaust duct in which—in the direction of flow of an exhaust gas of the internal combustion engine through the exhaust duct—a three-way catalytic converter is arranged underhood and a particulate filter with a catalytically active coating is arranged downstream from the underhood three-way catalytic converter. The exhaust aftertreatment system has a regeneration air system according to the invention, an intake point for the regeneration air of the regeneration air system being formed at the exhaust duct downstream from the underhood three-way catalytic converter and upstream from the particulate filter. Such a particulate filter with a three-way catalytically active coating is also referred to as a four-way catalytic converter. In this context, an underhood arrangement of the three-way catalytic converter means an arrangement in the exhaust duct in which the intake of the three-way catalytic converter has an exhaust run length of less than 80 cm, preferably less than 50 cm, from the outlet of the internal combustion engine. Such a system can reduce the pollutant emissions of the internal combustion engine compared to a regeneration air system in which the quantity of regeneration air is merely controlled. This makes it possible both to set a stoichiometric combustion air ratio upstream from the particulate filter in the exhaust duct in order to heat the particulate filter to its regeneration temperature and to set a defined superstoichiometric combustion air ratio in order to precisely adjust the excess of oxygen during regeneration in order to oxidize the soot that is retained in the particulate filter. This can counter the risk of thermal damage to the particulate filter during the regeneration of the particulate filter. Furthermore, the adaptation of the regeneration air mass flow can prevent the particulate filter from cooling below its regeneration temperature due to insufficient soot oxidation. This enables the best possible burning rate to be achieved for a fast and low-emission regeneration of the particulate filter.

In a preferred embodiment of the exhaust aftertreatment system, a provision is made that a turbine of an exhaust gas turbocharger is arranged in the exhaust duct downstream from an outlet of the internal combustion engine and upstream from the underhood three-way catalytic converter. Additional energy is extracted from the exhaust gas flow of the internal combustion engine by a turbine of an exhaust gas turbocharger. This is why it is particularly difficult to heat a particulate filter in an underbody position to its regeneration temperature in an internal combustion engine with an exhaust gas turbocharger. The use of such an exhaust aftertreatment system in a turbo engine is therefore especially advantageous.

In an advantageous embodiment of the invention, a provision is made that a first lambda sensor, particularly a wideband lambda sensor, is arranged in the exhaust duct upstream from the underhood three-way catalytic converter, particularly downstream from the turbine of the exhaust gas turbocharger and upstream from the underhood three-way catalytic converter. A wideband lambda sensor upstream from the underhood three-way catalytic converter enables the combustion air ratio of the internal combustion engine to be determined exactly. This enables the injection quantity to be precisely regulated in order to set a desired combustion air ratio in the combustion chambers of the internal combustion engine. The exhaust gas mass flow introduced into the exhaust system by the internal combustion engine can be determined with precision by the engine control unit. With these two variables, the necessary amount of regeneration air can be calculated for a desired combustion air ratio upstream from the particulate filter and passed on as a controlled variable to the controller of the regeneration air delivery element.

In another improvement of the exhaust aftertreatment system, a provision is made that a second lambda sensor with the catalytically active coating is arranged in the exhaust duct downstream from the intake point for the regeneration air and upstream from the particulate filter. The second lambda sensor can be used to control the combustion air ratio if the regeneration air system is deactivated in order to improve the control quality of the lambda control and to achieve an especially efficient conversion of the pollutants by the underhood three-way catalytic converter.

In another improvement of the exhaust aftertreatment system, a provision is made that a differential pressure sensor is provided in the exhaust system with which a pressure difference can be measured via the particulate filter with the catalytically active coating. The soot load of the particulate filter can be estimated by a differential pressure sensor, and regeneration of the particulate filter can be initiated if a specified threshold value is exceeded.

According to the invention, a method for exhaust aftertreatment of an internal combustion engine with an exhaust system is proposed which is connected to an outlet of an internal combustion engine, the exhaust system having an exhaust duct in which—in the direction of flow of an exhaust gas of the internal combustion engine through the exhaust duct—a three-way catalytic converter is arranged underhood and a particulate filter with a catalytically active coating is arranged downstream from the underhood three-way catalytic converter. The exhaust aftertreatment system also has a regeneration air system according to the invention, an intake point for the regeneration air of the regeneration air system being formed at the exhaust duct downstream from the underhood three-way catalytic converter and upstream from the particulate filter. The method comprises the following steps:

Determining an exhaust gas temperature or a component temperature of the particulate filter with the catalytically active coating, heating the particulate filter when the determined exhaust gas temperature or the component temperature of the particulate filter is below a regeneration temperature necessary for the regeneration of the particulate filter, with the internal combustion engine being operated with a substoichiometric combustion air ratio, with fresh air being blown into the exhaust duct by the regeneration air system with which the unburned exhaust gas components on the catalytically active coating of the particulate filter are reacted exothermically, and with the metering and regulation of the regeneration air mass flow being performed in such a way that a stoichiometric or superstoichiometric exhaust gas is established downstream from an intake point for the regeneration air.

A method according to the invention enables improved control of the combustion air ratio in the exhaust system of the internal combustion engine to be achieved. As a result of the improved regulation of the quantity of regeneration air, the emissions can be reduced particularly during regeneration of the particulate filter. It is also possible to reduce the fuel consumption of the internal combustion engine, since the heating phase and the regeneration phase of the particulate filter can be shortened by virtue of the more precise regulation of the amount of regeneration air, and the internal combustion engine can thus be operated longer at its consumption-optimal operating point.

In a preferred design variant of the method, a provision is made that an actual mass flow is determined and compared with a target mass flow, the regeneration air delivery element being regulated appropriately by a controller if the actual mass flow deviates from the target mass flow. Comparing the actual mass flow with the target mass flow makes it possible to precisely regulate the regeneration mass flow in a simple manner.

In an advantageous embodiment of the method, a provision is made that the exhaust gas temperature of the internal combustion engine is determined and compared with a threshold temperature, with internal engine heating measures being initiated if the exhaust gas temperature is below the threshold temperature. If the exhaust gas temperature is below a light-off temperature of the catalytically active coating of the internal combustion engine, the exhaust gas temperature is first raised by means of internal engine measures, such as an adjustment of the ignition timing in the "late" direction, or a lambda split operation between the different combustion chambers. In this way, the regeneration temperature of the particulate filter of approximately 600° C. does not have to be reached; instead, it is sufficient to heat the particulate filter to the light-off temperature of the catalytically active coating of approximately 300° C. The internal engine heating phase can thus be significantly shortened. Once the catalytically active coating of the particulate filter has reached its light-off temperature, the particulate filter is further heated by the substoichiometric operation of the internal combustion engine and simultaneous blowing-in of regeneration air, the unburned exhaust gas components, in particular unburned hydrocarbons (HC), carbon monoxide (CO), and hydrogen ($H_2$) on the catalytically active coating of the particulate filter are reacted exothermically until the particulate filter has reached its regeneration temperature.

In a preferred embodiment of the method, a provision is made that the regeneration air system has an air mass meter, the regeneration air mass flow being inferred from a change in the output signal of the air mass meter. The regeneration air mass flow can be determined with particular exactitude using a hot-film air mass meter.

Alternatively, a provision is advantageously made that a pressure difference $\Delta p$ is determined via the regeneration air delivery element, the regeneration air mass flow being calculated from the pressure difference $\Delta p$ and the rotational speed of the regeneration air delivery element. A simple regulation of the regeneration air mass flow can also be achieved by means of a differential pressure sensor.

In a preferred variant of the method, a provision is made that a combustion air ratio is determined at the first lambda sensor and the regeneration air mass flow is regulated in such a way that a stoichiometric exhaust gas results downstream from the intake point. An efficient conversion of the pollutants by the catalytically active coating of the particulate filter during the heating phase of the particulate filter can thus be ensured.

In another improvement of the method, a provision is made that an exhaust gas temperature is determined upstream and/or downstream from the particulate filter, the regeneration air mass flow being regulated in such a way that thermal damage to the particulate filter is avoided and/or a drop in the temperature of the particulate filter below its regeneration temperature is prevented. As a result, a burning rate for the soot particulates retained in the particulate filter can be set with which the particulate filter can be regenerated as quickly as possible.

Unless otherwise stated in the individual case, the various embodiments of the invention mentioned in this application can be advantageously combined with one another.

BRIEF DESCRIPTION OF THE DRAWINGS

The invention will be explained below in exemplary embodiments with reference to the accompanying drawing. Same components or components with the same function are identified in the drawings with the same reference numerals. In the drawing.

DETAILED DESCRIPTION OF THE INVENTION

Figure 1:
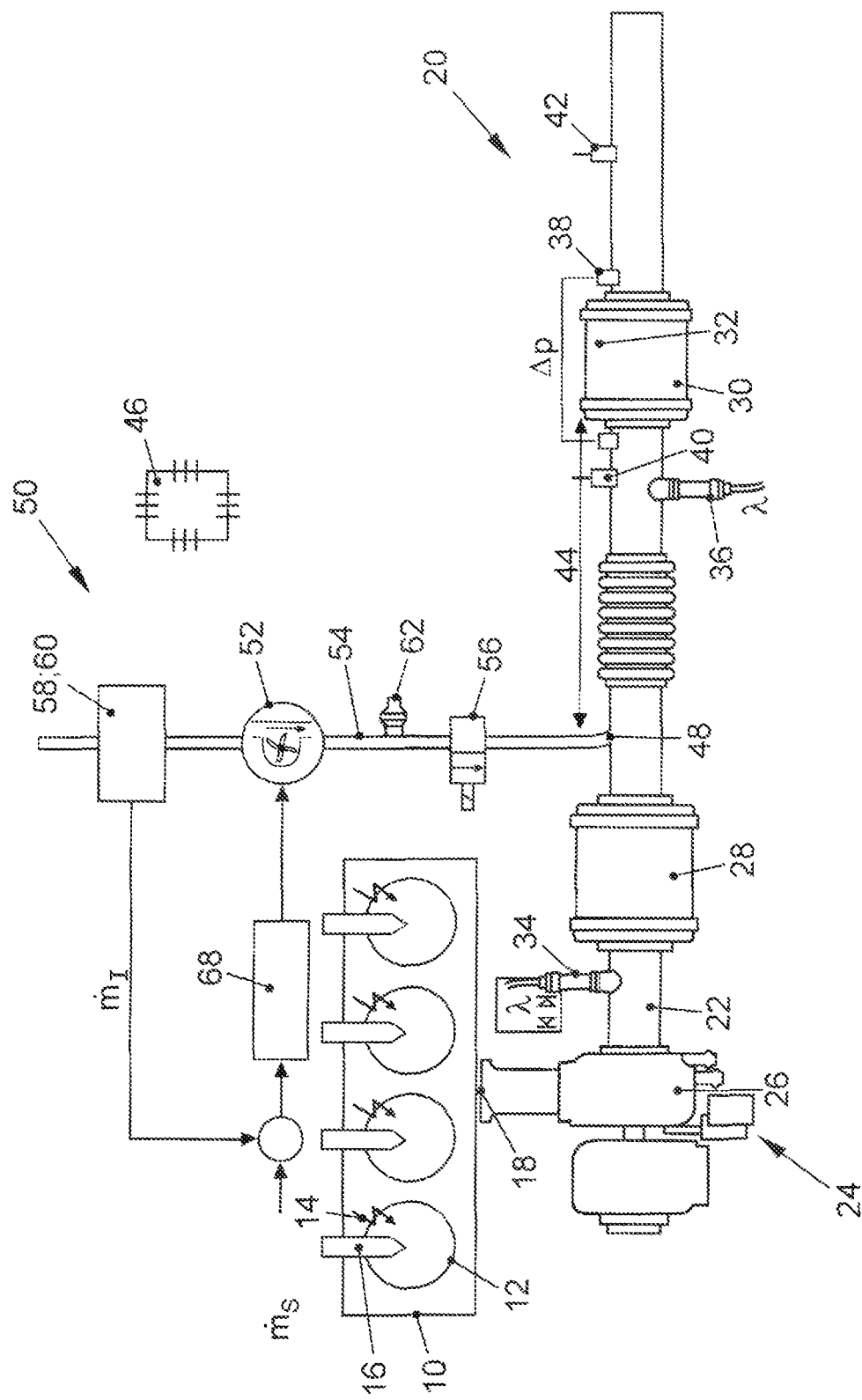
FIG. 1 shows a first embodiment for an internal combustion engine with an exhaust aftertreatment system according to the invention.

FIG. 1 shows the schematic representation of an internal combustion engine 10 that is connected with its outlet 18 to an exhaust system 20. In this exemplary embodiment, the internal combustion engine 10 is a direct-injection gasoline engine and has a plurality of combustion chambers 12. A spark plug 14 and a fuel injector 16 for injecting a fuel into the respective combustion chamber 12 are arranged at the combustion chambers 12. Intake valves and exhaust valves are arranged at the combustion chambers with which a fluid connection from the air intake system to the combustion chambers 12 or from the combustion chambers 12 to the exhaust system 20 can be opened or closed. The exhaust system 20 comprises an exhaust duct 22 in which are arranged, in the direction of flow of an exhaust gas of the internal combustion engine 10 through the exhaust duct 22, a turbine 26 of an exhaust gas turbocharger 24 and, downstream from the turbine 26, a three-way catalytic converter 28. A particulate filter 30 with a three-way catalytically active coating 32, which is also referred to as a four-way catalytic converter, is arranged downstream from the underhood three-way catalytic converter 28 in an underbody position of a motor vehicle. The exhaust aftertreatment system further comprises a regeneration air system 50 by means of which regeneration air can be blown into the exhaust duct 22 downstream from the underhood three-way catalytic converter 28 and upstream from the particulate filter 30 at an intake point 48.

The regeneration air system 50 comprises a regeneration air delivery element 52 and a regeneration air duct 54, which connects the regeneration air delivery element 52 to the intake point 48 at the exhaust duct 22. A regeneration air valve 56 is arranged in the regeneration air duct 54 with which the regeneration air supply to the exhaust duct 22 can be released or blocked. Furthermore, the regeneration air valve 56 prevents exhaust gas from flowing out of the exhaust duct in the direction of the regeneration air system 50. An air mass meter 58, particularly a hot-film air mass meter 60, is arranged in the regeneration air duct 54 upstream from the regeneration air delivery element 52. Furthermore, a regulator 68 is provided on the regeneration air system 50 with which the speed of the regeneration air delivery element 52 can be regulated.

A first lambda sensor 34, which is embodied as a wideband lambda sensor, is arranged downstream from the turbine 26 of the exhaust gas turbocharger 24 and upstream from the underhood three-way catalytic converter 28. A second lambda sensor 36, which is preferably embodied as a two-step sensor, is arranged downstream from the intake point 48 and upstream from the particulate filter 30. Furthermore, a differential pressure sensor 38 is provided in the exhaust duct 22 with which a pressure difference can be determined via the particulate filter 30. Furthermore, a respective temperature sensor 40, 42 is provided upstream and downstream from the particulate filter 30 in order to detect the exhaust gas temperatures upstream and downstream from the particulate filter 30. A mixing section 44 is formed between the intake point 48 and an inlet of the particulate filter 30 in which the exhaust gas of the internal combustion engine 10 mixes with the fresh air from the regeneration air system 50.

A regulation of the regeneration air mass flow $\dot{m}_{SL}$ by the second lambda sensor 36 cannot be achieved with sufficient accuracy, since with an under-stoichiometric combustion air ratio, hydrogen in an unknown amount is formed on the underhood three-way catalytic converter 28 and falsifies the sensor signal of the second lambda sensor 36.

The internal combustion engine 10 is connected to an engine control unit 46 with which the fuel injection quantity, the ignition timing, and the regeneration air quantity, among other things, are regulated.

The invention therefore makes a provision for the hot-film air mass meter 60 to be used for the precise air metering in the regeneration air duct 54. The combustion air ratio in the combustion chambers 12 of the internal combustion engine 10 can be set very precisely through the adaptation of the mixture. The air mass flow supplied to the internal combustion engine 10 and the exhaust gas mass flow resulting therefrom can likewise be determined exactly by the engine control unit 46. With these two variables, the regeneration air mass flow $\dot{m}_{SL}$ that is required in order to achieve the target combustion air ratio upstream from the particulate filter 30 can be calculated and passed on as a controlled variable to the controller 68 of the regeneration air delivery element 52.

Figure 2:
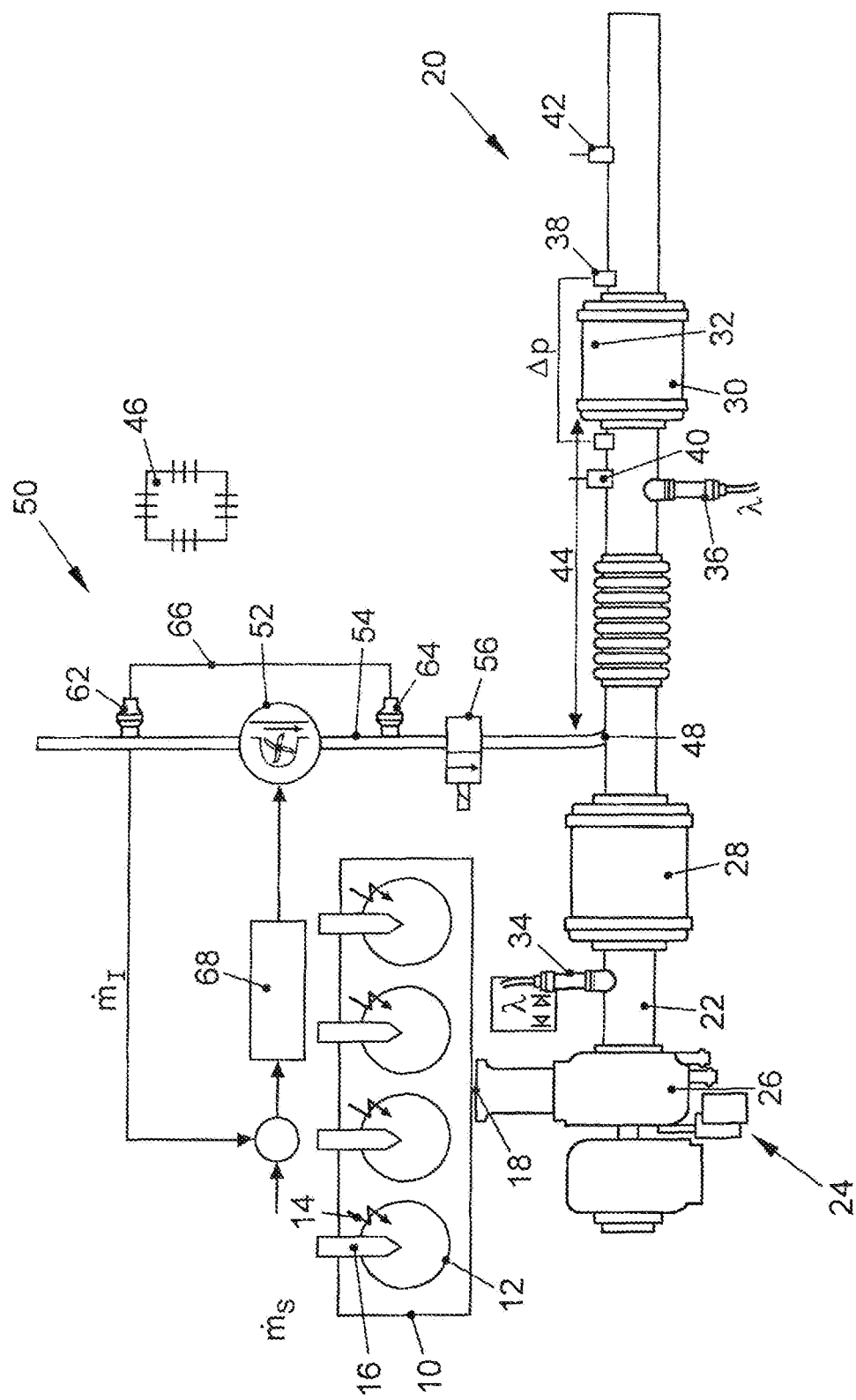
FIG. 2 shows another embodiment for an internal combustion engine with an exhaust aftertreatment system according to the invention.

FIG. 2 shows another exemplary embodiment of an exhaust aftertreatment system according to the invention for an internal combustion engine 10. With essentially the same construction as that shown in FIG. 1, the amount of regeneration air in the regeneration air system 50 is not determined by a hot-film air mass meter 60, but by pressure sensors 62, 64, which, as differential pressure sensors 66, determine a pressure difference $\Delta p$ via the regeneration air delivery element 52. The regeneration air mass flow $\dot{m}_{SL}$ can be used in an alternative manner to determine this pressure difference $\Delta p$ and the speed $\dot{m}_{SL}$ of the regeneration air delivery element 52.

During operation of the internal combustion engine 10, the particulate filter 30 is loaded with soot particulates from the exhaust gas of the internal combustion engine 10. Since regeneration of the particulate filter 30 requires a temperature of greater than 600° C., such a temperature cannot be achieved or can only be achieved with extreme difficulty by internal engine heating measures during low-load operation. Therefore, the particulate filter 30 is provided with a catalytically active coating 32, which enables exothermic conversion of unburned exhaust gas components—in particular unburned hydrocarbons, carbon monoxide, and hydrogen—while heating the particulate filter 30. For this purpose, the internal combustion engine 10 is operated with a substoichiometric combustion air ratio $\lambda<1$, and regeneration air is blown into the exhaust duct 22 at the same time. Such heating of the particulate filter 30 is also referred to as chemical heating. As a result of this possibility, the particulate filter 30 only has to be heated to the light-off temperature of the catalytically active coating 32 for regeneration. After the regeneration temperature has been reached, the amount of regeneration air can be increased while maintaining the chemical heating via the regeneration air system 50, so that an over-stoichiometric exhaust gas is established downstream from the intake point 48. With the excess of oxygen in the exhaust gas, the soot retained in the particulate filter 30 can thus be oxidized and the particulate filter 30 regenerated. For a fast and low-emission regeneration of the particulate filter, it is necessary to know the regeneration air mass flow $\dot{m}_{SL}$ with maximum possible accuracy.

During the heating phase, the substoichiometric operation of the internal combustion engine 10 on the underhood three-way catalytic converter forms ammonia, which would be converted into nitrogen oxide in the particulate filter 30 if the excess air were too high. An excessively low air supply would lead to the emission of hydrocarbons, carbon monoxide, and ammonia.

During the regeneration phase of the particulate filter, an excessively high regeneration air mass flow $\dot{m}_{SL}$ can unintentionally reduce the temperature in the particulate filter 30, thereby interrupting the regeneration, or in case of an excessive soot load of the particulate filter, cause thermal damage to the particulate filter 30 due to excessive exothermicity. If the regeneration air mass flow $\dot{m}_{SL}$ is too low, the regeneration will take place too slowly and therefore not be completed within a reasonable time interval.

Figure 3:
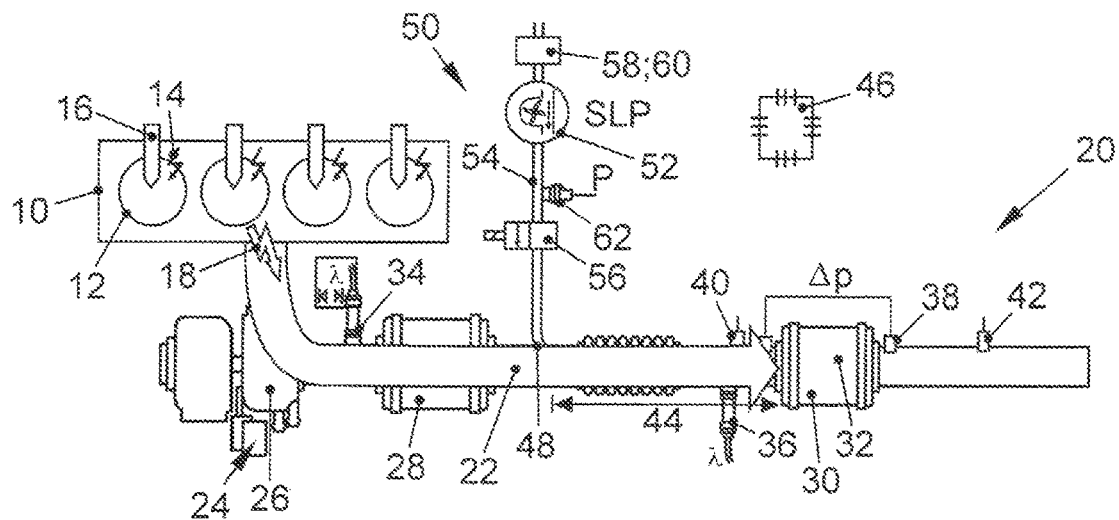
FIG. 3 shows an operating state of the internal combustion engine in which the particulate filter is heated to its light-off temperature by internal engine measures.

FIG. 3 shows a first operating state of the internal combustion engine 10, in which the particulate filter 30 is heated up exclusively by means of internal engine measures, such as an adjustment of the ignition angle in the "late" direction. The internal combustion engine 10 is operated with a stoichiometric combustion air ratio in order to enable efficient conversion by the underhood three-way catalytic converter 10 of the pollutants in the exhaust gas of the internal combustion engine 10. The regeneration air system 50 is deactivated, and the regeneration air valve 56 is closed. This operating state is maintained as long as the catalytically active coating 32 of the particulate filter 30 has not yet reached its light-off temperature.

Figure 4:
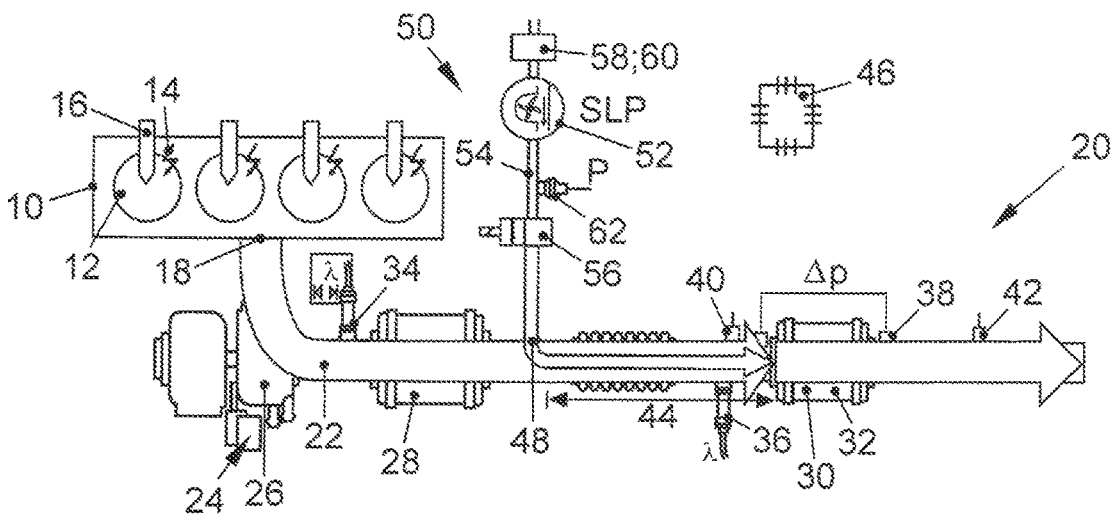
FIG. 4 shows a second operating state of the internal combustion engine, in which regeneration air is blown in for the purpose of further heating the particulate filter through an exothermic conversion of the unburned exhaust gas components with the regeneration air.

Once the three-way catalytically active coating 32 of the particulate filter 30 has reached its light-off temperature of approximately 300° C., from which an efficient conversion of the pollutants in the exhaust gas of the internal combustion engine with release of heat is possible, the internal combustion engine 10 is operated in the operating state shown in FIG. 4. The internal combustion engine 10 is operated with a substoichiometric combustion air ratio and, at the same time, regeneration air is blown into the exhaust duct 22 at the intake point 48, so that a stoichiometric exhaust gas is produced at the inlet of the particulate filter 30. The unburned exhaust gas components are reacted with the regeneration air exothermically on the catalytically active surface 32 of the particulate filter 32 until the latter has reached its regeneration temperature of approximately 600° C.

Figure 5:
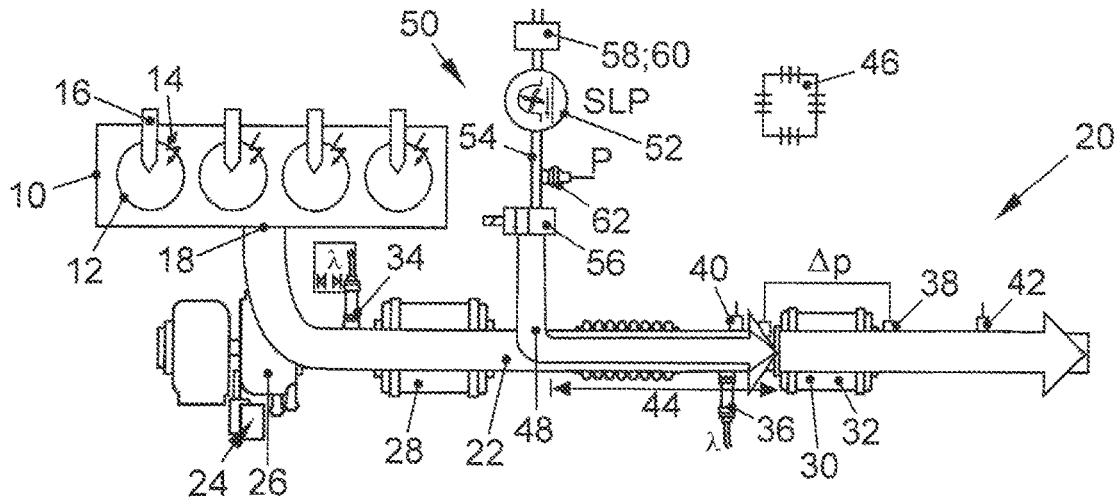
FIG. 5 shows a third operating state of the internal combustion engine, in which the particulate filter is regenerated after its regeneration temperature has been reached, the regeneration air system supplying the oxygen required to oxidize the soot retained in the particulate filter.

Subsequently, as shown in FIG. 5, the amount of regeneration air is increased, so that a superstoichiometric exhaust gas occurs downstream from the intake point 48. The soot particles retained in the particulate filter 30 are oxidized with the residual oxygen in the exhaust gas, thereby regenerating the particulate filter 30. The internal combustion engine 10 preferably continues to be operated with a substoichiometric combustion air ratio in order to maintain the chemical heating of the particulate filter 30 during the regeneration and to prevent the particulate filter 30 from cooling below its regeneration temperature.

LIST OF REFERENCE SYMBOLS

10 combustion engine
12 combustion chamber
14 spark plug
16 fuel injector
18 outlet
20 exhaust system
22 exhaust duct
24 exhaust gas turbocharger
26 turbine
28 three-way catalytic converter
30 particulate filter
32 catalytically active coating
34 first lambda sensor/wideband lambda sensor
36 second lambda sensor/two-step sensor
38 differential pressure sensor
40 first temperature sensor
42 second temperature sensor
44 mixing section
46 engine control unit
48 intake point
50 regeneration air system
52 regeneration air delivery element
54 regeneration air duct
56 regeneration air valve
58 air mass meter
60 hot-film air mass meter
62 first pressure sensor
64 second pressure sensor
66 differential pressure sensor
68 regulator

The invention claimed is:

1. A method for exhaust aftertreatment of an internal combustion engine, with an exhaust system that can be connected to an outlet of the internal combustion engine, the exhaust system having an exhaust duct in which, in the direction of flow of an exhaust gas of the internal combustion engine through the exhaust duct, a three-way catalytic converter is arranged underhood and a particulate filter with a catalytically active coating is arranged downstream from the underhood three-way catalytic converter, as well as with an exhaust aftertreatment system of a regeneration air system, an intake point for the regeneration air of the regeneration air system being formed at the exhaust duct downstream from the underhood three-way catalytic converter and upstream from the particulate filter, comprising the following steps:

determining an exhaust gas temperature ($T_{EG}$) or a component temperature ($T_{OPF}$) of the particulate filter with the catalytically active coating, heating the particulate filter when the determined exhaust gas temperature ($T_{EG}$) or the component temperature ($T_{OPF}$) of the particulate filter is below a regeneration temperature ($T_{reg}$) required for the regeneration of the particulate filter, with the internal combustion engine being operated with a substoichiometric combustion air ratio ($\lambda<1$), with fresh air being blown into the exhaust duct by the regeneration air system with which the unburned exhaust gas components on the catalytically active coating of the particulate filter are reacted exothermically, and with the metering and regulation of the regeneration air mass flow $\dot{m}_{SL}$ being performed in such a way that a stoichiometric or superstoichiometric exhaust gas is established downstream from an intake point of the regeneration air system into the exhaust duct, wherein a pressure difference $\Delta p$ is determined via a regeneration air delivery element, of the regeneration air system, the regeneration air mass flow $\dot{m}_{SL}$ being calculated from the pressure difference $\Delta p$ and a rotational speed $n_{SL}$ of the regeneration air delivery element.

2. The method for exhaust aftertreatment of an internal combustion engine as set forth in claim 1, further comprising determining an actual mass flow and comparing it with a target mass flow, the regeneration air delivery element being regulated appropriately by a controller if the actual mass flow deviates from the target mass flow.

3. The method for exhaust aftertreatment of an internal combustion engine as set forth in claim 1, wherein the exhaust gas temperature ($T_{EG}$) of the internal combustion engine is determined and compared with a threshold temperature ($T_S$), with internal engine heating measures being initiated if the exhaust gas temperature ($T_{EG}$) is below the threshold temperature ($T_S$).

4. The method for exhaust aftertreatment of an internal combustion engine as set forth in claim 1, wherein the regeneration air system has an air mass meter, the regeneration air mass flow $\dot{m}_{SL}$, being inferred from a change in the current or in the resistance of the air mass meter.

5. A method for exhaust aftertreatment of an internal combustion engine, with an exhaust system that can be connected to an outlet of the internal combustion engine, the exhaust system having an exhaust duct in which, in the direction of flow of an exhaust gas of the internal combustion engine through the exhaust duct, a three-way catalytic converter is arranged underhood and a particulate filter with a catalytically active coating is arranged downstream from the underhood three-way catalytic converter, as well as with an exhaust aftertreatment system of a regeneration air system, an intake point for the regeneration air of the regeneration air system being formed at the exhaust duct downstream from the underhood three-way catalytic converter and upstream from the particulate filter, comprising the following steps:

determining an exhaust gas temperature ($T_{EG}$) or a component temperature ($T_{OPF}$) of the particulate filter with the catalytically active coating, heating the particulate filter when the determined exhaust gas temperature ($T_{EG}$) or the component temperature ($T_{OPF}$) of the particulate filter is below a regeneration temperature ($T_{reg}$) required for the regeneration of the particulate filter, with the internal combustion engine being operated with a substoichiometric combustion air ratio ($\lambda<1$), with fresh air being blown into the exhaust duct by the regeneration air system with which the unburned exhaust gas components on the catalytically active coating of the particulate filter are reacted exothermically, and with the metering and regulation of the regeneration air mass flow $\dot{m}_{SL}$ being performed in such a way that a stoichiometric or superstoichiometric exhaust gas is established downstream from an intake point of the regeneration air system into the exhaust duct, and determining a combustion air ratio ($\lambda_1$) at a first lambda sensor, and the regeneration air mass flow $\dot{m}_{SL}$ is regulated in such a way that a stoichiometric exhaust gas results downstream from the intake point.

6. The method as set forth in claim 1, further comprising determining an exhaust gas temperature ($T_{EG}$) upstream and/or downstream from the particulate filter, the regeneration air mass flow $\dot{m}_{SL}$ being regulated in such a way that thermal damage to the particulate filter is avoided and/or a drop in the temperature ($T_{OPF}$) of the particulate filter below its regeneration temperature ($T_{reg}$) is prevented.

\* \* \* \* \*